(12) United States Patent
Baker

(10) Patent No.: US 10,438,503 B2
(45) Date of Patent: Oct. 8, 2019

(54) SYSTEM AND METHOD FOR SIMULATED NON-LETHAL WEAPONS TRAINING

(71) Applicant: Perry Baker, Tempe, AZ (US)

(72) Inventor: Perry Baker, Tempe, AZ (US)

(73) Assignee: Virtra, Inc, Tempe, AZ (US)

( * ) Notice: Subject to any disclaimer, the term of this patent is extended or adjusted under 35 U.S.C. 154(b) by 536 days.

(21) Appl. No.: 15/193,056

(22) Filed: Jun. 25, 2016

(65) Prior Publication Data

US 2017/0372632 A1    Dec. 28, 2017

(51) Int. Cl.
*G09B 9/00* (2006.01)
*G09B 5/06* (2006.01)

(52) U.S. Cl.
CPC .......... *G09B 9/003* (2013.01); *G09B 5/065* (2013.01); *G09B 5/067* (2013.01)

(58) Field of Classification Search
CPC ........ G09B 9/003; G09B 5/065; G09B 5/067; F41A 33/00; F41A 33/02; F41A 33/04; F41A 33/06; F41A 33/08; F41G 3/26
See application file for complete search history.

(56) References Cited

U.S. PATENT DOCUMENTS

2007/0264616 A1* 11/2007 Namgung ............... F41A 33/02
434/16
2016/0231087 A1* 8/2016 Dvorkin ............... F41G 3/2605

* cited by examiner

*Primary Examiner* — Timothy A Musselman

(74) *Attorney, Agent, or Firm* — Wright Law Group, PLLC; Mark F. Wright

(57) ABSTRACT

A simulated non-lethal weapon comprises a cartridge that is fitted with an acoustic triggering mechanism. By detecting, capturing, and processing the sound of an electrical arc, the cartridge can activate a laser emitter. The laser emitter triggers a simulated laser "bullet" light and the laser light can be used to provide feedback about the shot placement for the simulated firearm in a laser-based simulation and training environment. In this fashion, more effective and efficient training with simulated non-lethal weapons can be conducted.

20 Claims, 3 Drawing Sheets

SYSTEM AND METHOD FOR SIMULATED NON-LETHAL WEAPONS TRAINING

BACKGROUND OF THE INVENTION

1. Field of the Invention

The present invention relates generally to the field of firearms training and more specifically relates to a training system using a simulated non-lethal electric weapon.

2. Related Art

Numerous types of devices are designed to apply a non-lethal electrical shock or impulse to humans and animals. These devices range from medical devices, requiring pre-market notification to or pre-market approval from the United States Food and Drug Administration, to non-lethal weapons that emit an electrical pulse or charge, intended primarily for use by law enforcement personnel, military personnel and certain self-defense applications. In general, these non-lethal weapons are used to subdue and capture criminals or other dangerous people or animals. Representative designs for various type of non-lethal weapons are illustrated in U.S. Pat. Nos. 3,803,463, 4,688,140, and 6,636,412.

As with all weapon systems and platforms, training is an important part of preparing an operator to be skilled in the deployment and use of non-lethal weapons. There are a number of companies that market modified versions of the commercially available non-lethal weapons, suitable for a training environment. As with simulated lethal weapons, lasers are typically used to track/record muzzle or barrel movement, trigger pull, etc.

In general, the presently available simulated non-lethal weapons require extensive modification of the commercially available model. These modifications can be quite expensive and the modification may negatively impact how well the simulated non-lethal weapons mimics the real-world version of the non-lethal weapon. Further, once modified for training purposes, the modified weapon is not longer capable of being used in a real-world situation. It would be desirable to provide one or more approaches to simulating non-lethal weapons that would more closely mimic the operational aspects of commercially available models without the necessity of impairing or eliminating the use of the weapon in a real-world application. Accordingly, without improvements to the current equipment and methods used for simulating non-lethal weapons in a training environment, the training benefit offered to trainees and their sponsoring organizations will continue to be sub-optimal.

BRIEF SUMMARY OF THE INVENTION

A simulated non-lethal weapon comprises a cartridge that is fitted with an acoustic triggering mechanism. By detecting, capturing, and processing the sound of an electrical arc, the cartridge can activate a laser signal. The laser signal acts as a simulated "bullet" and the light from the laser can be used to provide feedback about the shot placement for the simulated firearm in a laser-based simulation and training environment. In this fashion, more effective and efficient training can be realized. Additional components such as a filter can be used to fine tune the audio frequency used in the triggering mechanism for the simulated non-lethal weapon. In at least one preferred embodiment of the present invention, a feedback device attached to the trainee provides a vibration or low-level electrical shock to the trainee in response to one or more actions taken by the trainee in response to the laser-based simulation and training environment. The low-level shock can be delivered via an electrical impulse element where the electrical impulse element comprises a housing containing an impulse generator a pair of electrodes in electrical communication with the impulse generator and the user. The results in the delivery of a non-disabling electrical pulse to the user to simulate being struck by an object such as a bullet or other projectile.

BRIEF DESCRIPTION OF THE SEVERAL VIEWS OF THE DRAWINGS

The preferred embodiments of the present invention will hereinafter be described in conjunction with the appended drawings, wherein like designations denote like elements.

DETAILED DESCRIPTION OF THE INVENTION

A simulated non-lethal weapon comprises a cartridge that is fitted with an acoustic triggering mechanism. By detecting, capturing, and processing the sound of an electrical arc created by the activation of a trigger, the cartridge generates a laser signal. The laser signal triggers a simulated laser "projectile" and the movement and placement of the laser projectile can be used to provide feedback about the shot placement for the simulated non-lethal firearm in a laser-based simulation and training environment. In this fashion, more realistic, effective, and efficient training can be realized. In at least one preferred embodiment of the present invention, a feedback device attached to the trainee provides a vibration or low-level electrical shock to the trainee in response to one or more actions taken by the trainee in response to the laser-based simulation and training environment.

Figure 1:
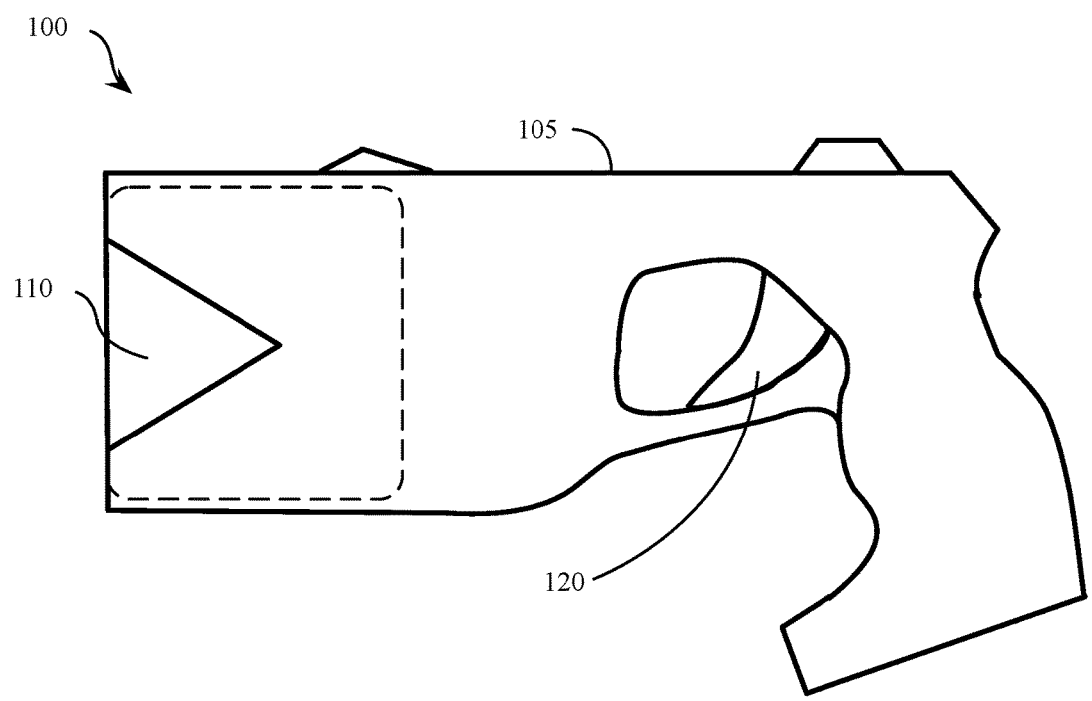
FIG. 1 is a schematic representation of a simulated non-lethal weapon with an acoustic triggering mechanism in accordance with a preferred exemplary embodiment of the present invention.

Referring now to FIG. 1, a schematic representation of a simulated non-lethal weapon 100 with an acoustic triggering mechanism in accordance with a preferred exemplary embodiment of the present invention is illustrated. Each simulated non-lethal weapon 100 is designed and manufactured to, as closely as possible, replicate the look and feel, including the weight and dimensions, of standard commercial non-lethal weapons used by law enforcement and military personnel.

In the most preferred embodiments of the present invention, simulated non-lethal weapon 100 comprises; a body 105, at least one cartridge 110 and a trigger 120. In the most preferred embodiments of the present invention, cartridge 110 is a standardized component that is fully compatible with a commercial non-lethal weapon used by law enforcement and military personnel. This approach allows military and law enforcement personnel to use their standard issued non-lethal weapons in a training environment. Cartridges 110 will fit seamlessly into commercial non-lethal weapons used by law enforcement and military personnel so as to minimize costs and maximize weapons familiarity during the training environment.

Figure 2:
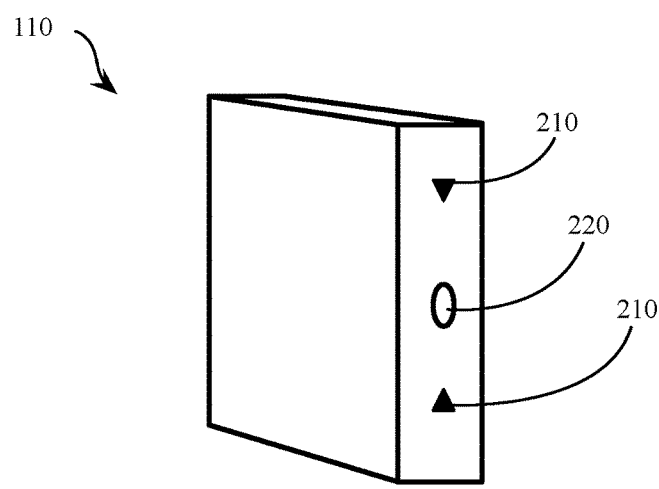
FIG. 2 is a schematic representation of a cartridge with an acoustic triggering mechanism suitable for use in a training environment using a simulated non-lethal weapon in accordance with a preferred exemplary embodiment of the present invention.

Referring now to FIG. 2, a schematic representation of a cartridge 110 with an acoustic triggering mechanism suitable for use in a training environment using a simulated non-lethal weapon in accordance with a preferred exemplary embodiment of the present invention is illustrated. As shown in FIG. 2, cartridge 110 comprises a pair of electrical contacts 210 and an acoustic microphone 220. Electrical contacts 210 will generate an electrical arc when trigger is pressed. In the most preferred embodiments of the present invention, acoustic microphone 220 will detect or "hear" the electrical arc and generate a signal that will be used to simulate the deployment of one or more non-lethal projectiles in a training environment. In conjunction with other components, as described in FIG. 3 below, an overall training environment for simulating the use of non-lethal weapons can be created.

Figure 3:
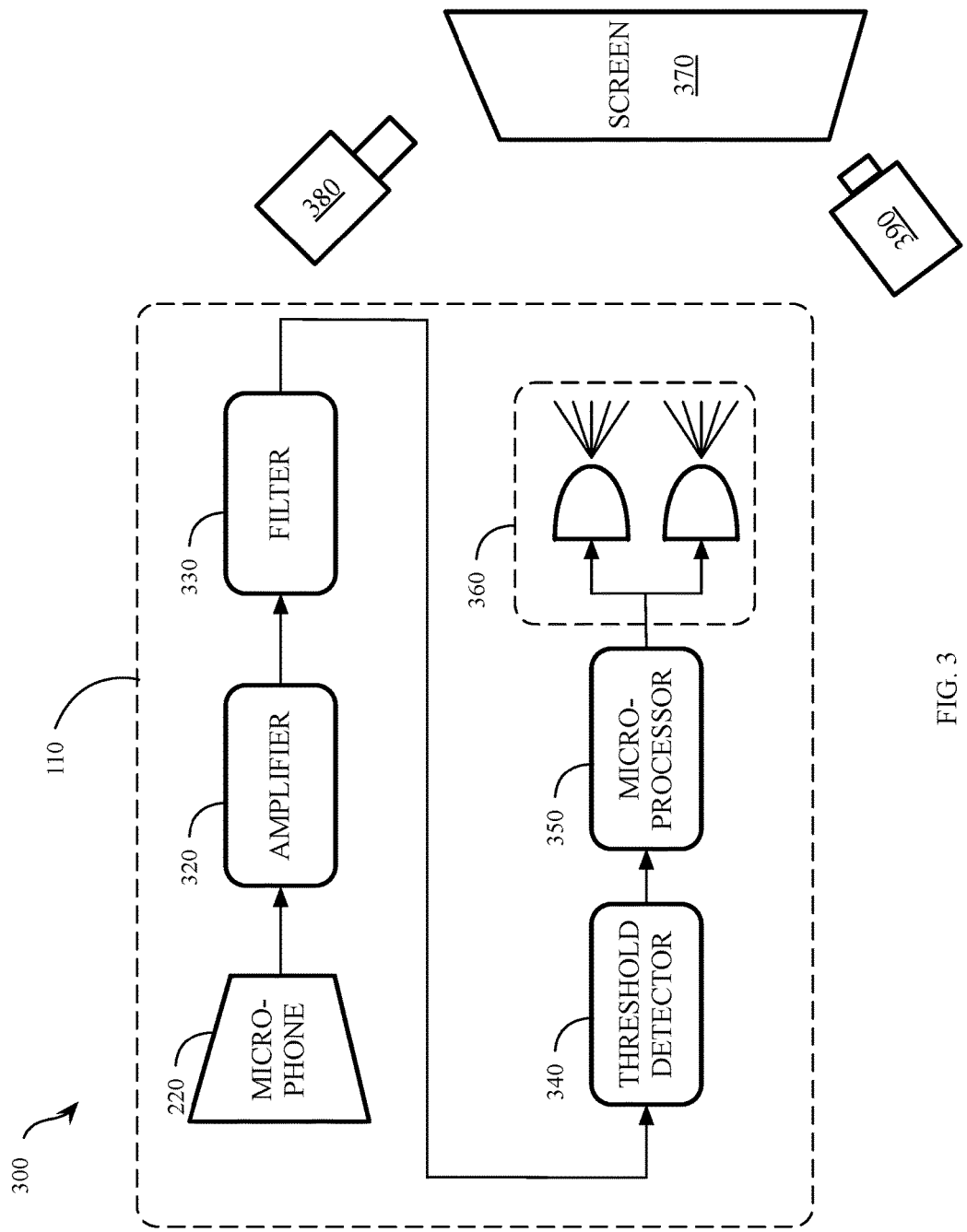
FIG. 3 is a schematic representation of a circuit used to implement an acoustic triggering mechanism suitable for use in a simulated non-lethal weapon in accordance with a preferred exemplary embodiment of the present invention.

Referring now to FIG. 3, a schematic representation of a circuit 300 used to implement an acoustic triggering mechanism suitable for use in the simulated non-lethal weapon 100 of FIG. 1 in accordance with a preferred exemplary embodiment of the present invention is illustrated. As shown in FIG. 3, circuit 300 is most preferably contained within cartridge 110 of FIG. 1 and comprises: a microphone 220; an amplifier 320; a filter 330; a threshold detector 340; a microprocessor 350; and a plurality of emitters 360.

The various components of circuit 300 are communicatively coupled to each other and arranged and configured to capture and transmit one or more signals used to simulate a projectile (e.g., one or more electrically connected barbs) being discharged from a simulated non-lethal weapon in a training environment. Additionally, a screen 370, a projector 380, and a camera 390 are included to represent additional components of the training environment for deploying a simulated non-lethal weapon in accordance with a preferred embodiment of the present invention.

Microphone 220 is an acoustic microphone positioned within the housing of cartridge 110 such that it can detect or "hear" ambient noises, including the electrical noise emitted by an electrical arc generated by simulated non-lethal weapon 100 of FIG. 1. Microphone 220 is selected for its capability to detect or "hear" the high frequency ultrasonic noise generated by simulated non-lethal weapons, which may be in the range of 25 kHz to -60 KHz or some other appropriate frequency range. Microphone 220 is most preferably configured to convert the ultrasonic noise from the electrical arc generated by simulated non-lethal weapon 110 of FIG. 1 into a low voltage electrical signal that is then transmitted to amplifier 320.

Amplifier 320 is signal-enhancing device configured to boost the signal strength of the low voltage electrical signal received from microphone 320 to a magnitude level that is suitable for the downstream electrical signal processing by the other components of circuit 300 such as filter 330.

Filter 340 is configured to filter out unrelated background noises and other unwanted signals that are not associated with the electrical frequency of the arc generated by the simulated non-lethal weapon 110 of FIG. 1. Most simulated non-lethal weapons generate an electrical arc that produces a sound with a unique sonic frequency characteristic. The use of filter 340 helps prevent inadvertent activation of non-lethal weapon 110 from noises associated with nearby ambient noises generated from sources. Filter 330 may be implemented in many different forms including as a low pass filter, a high pass filter, or a band pass filter, depending on the specific audio signal profile of the electrical arc generated by each make and model of simulated weapon. In this fashion, filter 330 is configurable for multiple weapons and training environments by simply matching the frequency response of filter 330 to the corresponding frequency generated by the simulated non-lethal weapon.

Threshold detector 340 monitors the filtered electrical signal generated by filter 330. Threshold detector 340 is designed to send an event signal (e.g., +3.3 volt logic level signal) to microprocessor when it detects/determines that the filtered signal demonstrates the appropriate frequency response to be characteristic of an electrical arc generated by simulated non-lethal weapon 110.

Microprocessor 350 performs computation and control functions and most preferably comprises a suitable central processing unit (CPU). Those skilled in the art will recognize that microprocessor 350 may comprise a single integrated circuit or may comprise any suitable number of integrated circuit devices and/or circuit boards working in cooperation to accomplish the functions of a processor or CPU. Microprocessor 350 is generally configured to execute one or more software programs.

Microprocessor 350 monitors the output from threshold detector 340 and selectively activates or deactivates emitters 360 (e.g., laser light sources) based on the generation of an electrical arc that is initiated by pulling the trigger of simulated non-lethal weapon 100 of FIG. 1. When the electrical arc is detected by circuit 300 of FIG. 3, the threshold output goes to a logic "high" state and microprocessor 350 internally registers that a valid arc has occurred. Microprocessor 350 then activates emitters 360 in a preprogrammed (typically pulsed) fashion. The pulsing sequence is "seen" on the screen by tracking cameras 390 and is then transmitted for conversion into an exact screen location. The screen location is further evaluated and used to determine if the simulated "barbs" were effectively aimed at the screen in such a fashion as to cause the intended simulated target to be effected in the desired location and manner.

Emitters 360 are most preferably mounted into cartridge 110 in such a manner that their emitted light path simulates and essentially replicates the path taken by both of the simulated barb projectiles as if they had been fired from an actual non-lethal weapon. By simulating the path of both barbs from an actual non-lethal weapon, the system can determine if the trainee is holding and aiming the simulated non-lethal weapon in a manner that would be effective in real life. The use of dual barb projectile simulation increases the fidelity and accuracy of the training system as the laser lights are projected onto various surfaces such as screen 370.

Screen 370 is used in conjunction with the additional computer hardware and software components (e.g., one or more projectors 380 and cameras 390) as part of a comprehensive simulated training environment. Various training scenarios are projected onto screen 370 by one or more projectors 380 and the trainee can use the simulated non-lethal weapon to interact with the training scenario displayed on screen 370. Those skilled in the art will recognize that screen 370 represents multiple screens that may be used in a simulation environment and the depiction of a single screen is not intended to limit the scope of the invention in any way.

The most preferred embodiments of a comprehensive simulated training environment using the various embodiments of the present invention also comprises one or more tracking cameras 390 that are used to monitor screen 370 and determine if a trainee has fired a weapon into the virtual training space (e.g. towards or onto the image projected on screen 370 by projector 380). The laser light emitted by emitters 360 is not perceptible by the human eye and, accordingly, can only be seen by tracking cameras 390 and not the trainee. Based on the trainee's reactions and muzzle movement of the simulated non-lethal weapon as represented by the laser lights emitted by emitters 360, cameras 390 can be used to track deployment of the simulated barbs and the comprehensive simulated training environment can be used to measure, adjust, and enhance the overall training experience.

Figure 4:
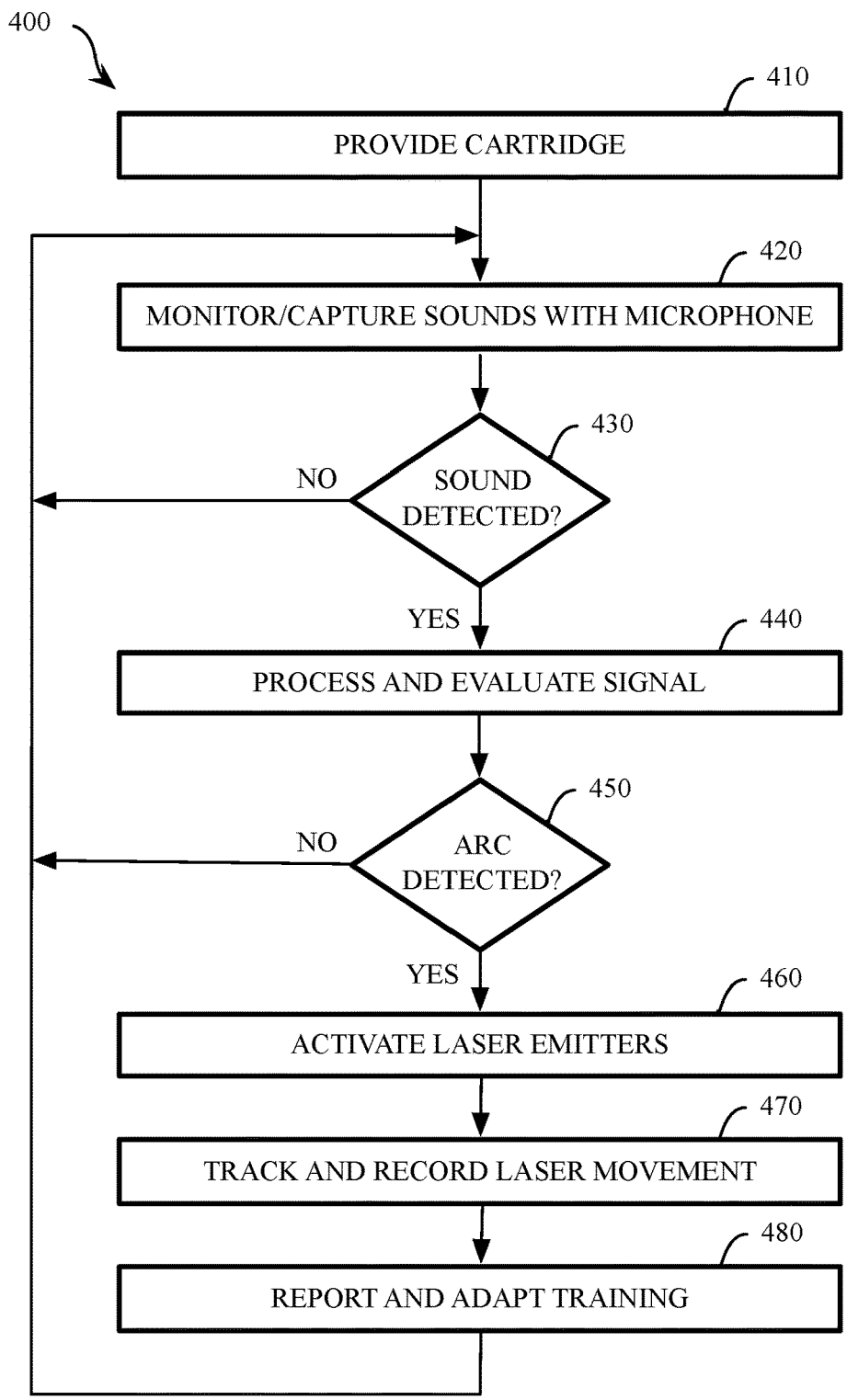
FIG. 4 is a flow chart of a method for conducting training using simulated non-lethal weapon with an acoustic triggering mechanism in accordance with a preferred exemplary embodiment of the present invention.

Referring now to FIG. 4, a flow chart of a method 400 for using a simulated non-lethal weapon with an acoustic triggering mechanism in accordance with a preferred exemplary embodiment of the present invention is depicted. As shown in FIG. 4, a cartridge for a simulated non-lethal weapon is provided for use (step 410). The cartridge contains a microphone that is used to monitor sounds from the ambient environment (step 420). While a sound is not detected (step 430="NO"), the microphone will continue to monitor for sounds (step 420).

Once a sound is detected (step 430="YES") then the signal can be processed and evaluated (step 440). The processing of the signal includes steps such as amplification and filtering to determine whether or not an arc has been activated by the pressing of the trigger on the simulated non-lethal weapon. If an arc has not been detected (step 450="NO"), the microphone will continue to monitor for sounds (step 420). If an arc is detected, (step 450="YES"), then the laser emitters are activated (step 460) and the path of the simulated projectiles can be tracked and recorded (step 470). The results can be stored in a computer database and then reported and used to evaluate the training and adapt the training programs for a simulated training environment.

From the foregoing description, it should be appreciated that simulated non-lethal training system disclosed herein presents significant benefits that would be apparent to one skilled in the art. Furthermore, while multiple embodiments have been presented in the foregoing description, it should be appreciated that a vast number of variations in the embodiments exist. Lastly, it should be appreciated that these embodiments are preferred exemplary embodiments only and are not intended to limit the scope, applicability, or configuration of the invention in any way. Rather, the foregoing detailed description provides those skilled in the art with a convenient road map for implementing a preferred exemplary embodiment of the invention, it being understood that various changes may be made in the function and arrangement of elements described in the exemplary preferred embodiment without departing from the spirit and scope of the invention as set forth in the appended claims.

The invention claimed is:

1. A simulated non-lethal simulated firearm training system comprising:
    a simulated non-lethal weapon, the simulated non-lethal weapon comprising:
        a trigger, where pulling the trigger activates an electrical arc;
        an acoustic microphone, the acoustic microphone capturing ambient sound;
        an amplifier communicatively coupled to the acoustic microphone. The amplifier boosting the ambient sound;
        a filter communicatively coupled to the amplifier, the filter being tuned to a particular frequency range;
        a threshold detector communicatively coupled to the filter;
        at least one microprocessor communicatively coupled to the threshold detector; and
        a plurality of emitters communicatively coupled to the at least one microprocessor, the plurality of emitters emitting laser signals based on the signal from the at least one microprocessor; and
    one or more devices used to monitor, track, or display the laser signals.

2. The simulated non-lethal simulated firearm training system of claim 1 wherein the one or more devices used to monitor, track, or display the laser signals comprises at least one of a camera, a projector, and a screen.

3. The simulated non-lethal firearm training system of claim 1 wherein the one or more devices used to monitor, track, or display the laser signals comprises a camera, a projector, and a screen.

4. The simulated non-lethal simulated firearm training system of claim 1 further comprising:
    a screen;
    at least one camera, the camera detecting and tracking movement associated with the laser signals emitted by the emitters when projected onto the screen.

5. The simulated non-lethal simulated firearm training system of claim 1 further comprising:
    a training scenario displayed to at least one user on at least one screen;
    at least one electrical impulse element, the at least one electrical impulse element comprising:
        a housing containing an impulse generator; and
        a pair of electrodes in electrical communication with each of the impulse generator and the at least one user; and
    at least one non-disabling electrical pulse generated by the impulse generator, the at least one non-disabling electrical pulse simulating an impact of a projectile, the at least one non-disabling electrical pulse being selectively delivered to the user via the pair of electrodes in response to at least one user reaction to the training scenario.

6. The simulated non-lethal simulated firearm training system of claim 1 wherein the filter comprises at least one of a low-pass filter, a band-pass filter, and a high-pass filter.

7. The simulated non-lethal simulated firearm training system of claim 1 further comprising:
    a training scenario displayed to at least one user on at least one screen;
    at least one feedback device, the at least one feedback device being affixed to the at least one user, the at least one feedback device vibrating in response to at least one user reaction to the training scenario.

8. The simulated non-lethal simulated firearm training system of claim 1 further comprising:
    a training scenario displayed to at least one user on at least one screen;
    at least one feedback device, the at least one feedback device being affixed to the at least one user, the at least one feedback device providing a low-level electrical shock in response to at least one user reaction to the training scenario.

9. The simulated non-lethal simulated firearm training system of claim 1 wherein the one or more devices used to monitor, track, or display the laser signals comprises:
 a plurality of projectors, the plurality of projectors displaying a training scenario;
 at least one screen, the at least one screen displaying the training scenario and the laser signals; and
 a plurality of cameras, the plurality of cameras capturing the combined image of the training scenario and the laser signals.

10. A method of training with a simulated non-lethal weapon, the method comprising the steps of:
 monitoring an environment with a microphone, where the microphone is contained within the simulated non-lethal weapon;
 capturing a sound with the microphone;
 processing the sound;
 triggering at least one laser emitter when the activation of an electrical arc is detected by processing the sound.

11. The method of claim 10 wherein the step of processing the sound comprises the steps of:
 amplifying the sound with an amplifier; and
 passing the sound through at least one of a high-pass filter, a low-pass filter, and a band-pass filter; and
 evaluating the sound based on a pre-determined threshold.

12. The method of claim 10 further comprising the steps of:
 tracking the movement of a laser light emitted by the at least one laser emitter; and
 recording the movement of the laser light emitted by the at least one laser emitter for purposes of evaluation and training.

13. The method of claim 10 wherein the activation of an electrical arc is accomplished by pulling a trigger on the simulated non-lethal weapon.

14. The method of claim 10 further comprising the steps of:
 displaying at least one laser signal on at least one screen based on the activation of the electrical arc as accomplished by pulling a trigger on the simulated non-lethal weapon; and
 tracking the movement of the at least one laser signal over time and displaying the relative position of the at least one laser signal on the at least one screen.

15. The method of claim 10 further comprising the step of displaying a training scenario on at least one screen to train at least one used in conjunction with the simulated non-lethal weapon.

16. The method of claim 10 further comprising the steps of:
 displaying a training scenario on at least one screen to train at least one used in conjunction with the simulated non-lethal weapon;
 displaying the at least one laser signal on the at least one screen, superimposed over the training scenario; and
 using at least one camera to capture the image of the at least one laser signal and the training scenario.

17. A simulated non-lethal weapon comprising:
 a housing;
 at least one cartridge inserted into the housing;
 a trigger affixed to the housing, the trigger initiating an electrical arc when pulled, the electrical arc generating an audible sound;
 an acoustic microphone contained within the cartridge, the acoustic microphone capturing an audible sound generated by the electrical arc;
 an amplifier contained within the cartridge, the amplifier amplifying the audible sound to create an amplified sound;
 a filter contained within the cartridge, the filter filtering the amplified sound to isolate a pre-determined frequency and create an amplified isolated sound;
 a threshold detector contained within the cartridge, the threshold detector detecting the amplified isolated sound; and
 a microprocessor contained within the cartridge, the microprocessor initiating at least one laser signal from an emitter in response to the amplified isolated sound.

18. The simulated non-lethal weapon of claim 17 wherein the filter comprises at least one of a low-pass filter, a band-pass filter, and a high-pass filter.

19. A simulated non-lethal weapon system, the simulated non-lethal weapon system comprising:
 a simulated weapon with a trigger, wherein activating the trigger generates an electrical arc;
 an acoustic microphone, the acoustic microphone capturing at least one sound generated by the electrical arc; and
 at least one laser emitter, the at least one laser emitter being activated in response to the at least one sound generated by the electrical arc.

20. The simulated non-lethal weapon system of claim 19 further comprising:
 a training scenario displayed on at least one screen;
 at least one laser signal generated by the at least one laser emitter, the at least one laser signal being displayed on the at least one screen; and
 at least one camera positioned to capture images displayed on the at least one screen, including the at least one laser signal and the training scenario.

* * * * *